INVENTOR.
EDWIN R. HIRT
BY
Bialas & Schlemmer
ATTORNEYS

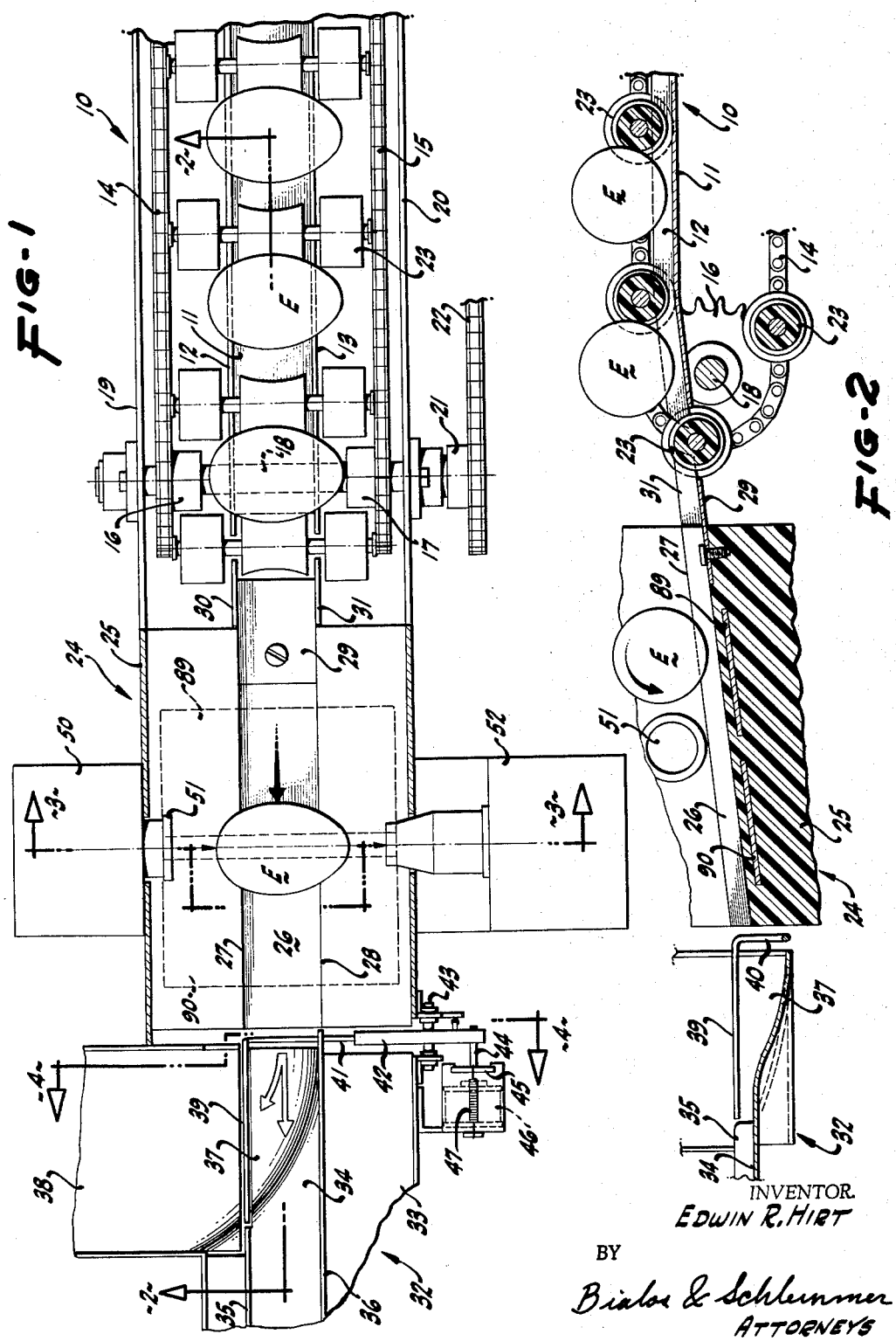

INVENTOR.
EDWIN R. HIRT
BY
Bialos & Schlemmer
ATTORNEYS

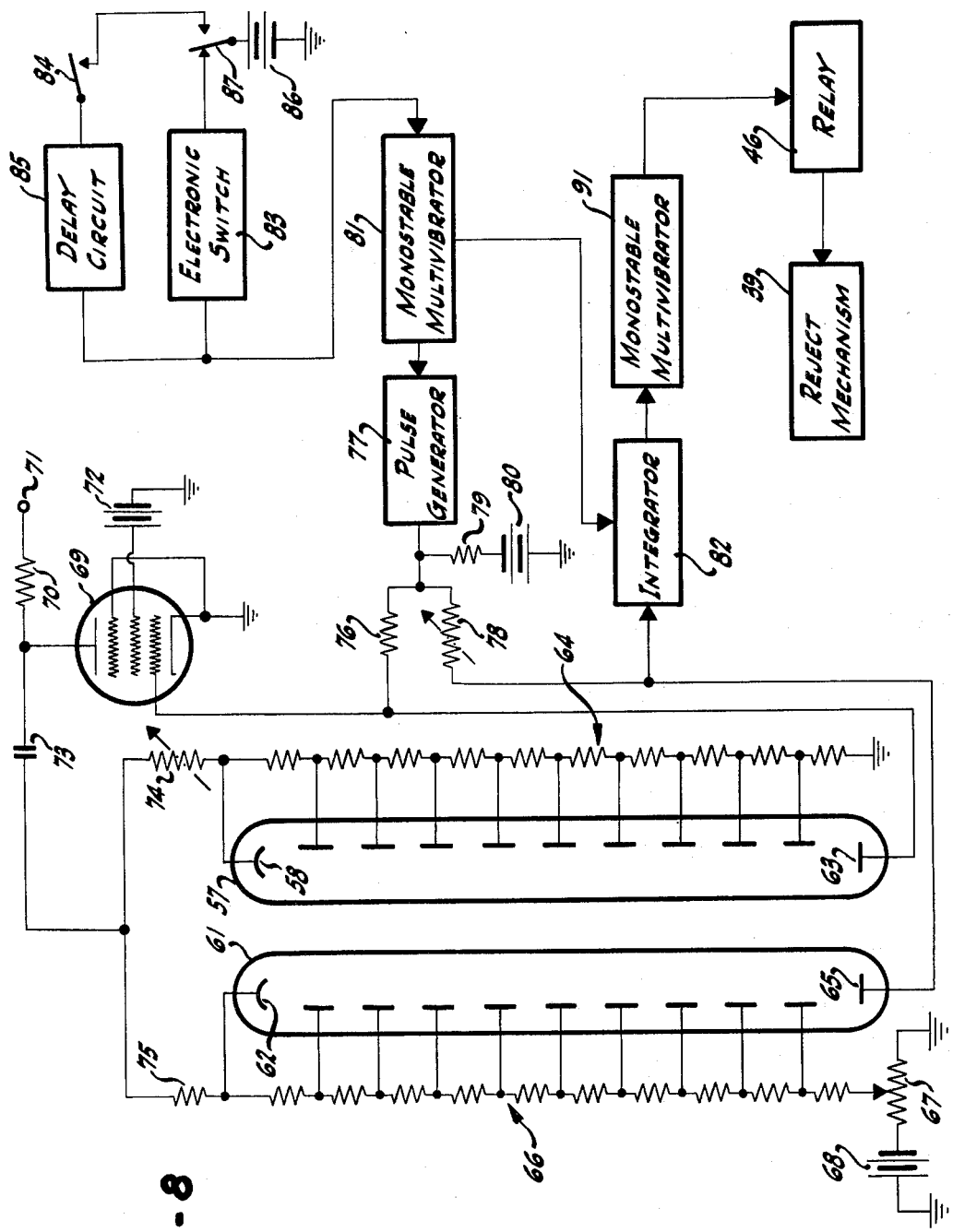

United States Patent Office 3,255,660
Patented June 14, 1966

3,255,660
OPTICAL TESTING APPARATUS WITH MEANS TO ENERGIZE THE DETECTING MEANS
Edwin R. Hirt, Orinda, Calif., assignor to Food Systems, Inc., Berkeley, Calif., a corporation of California
Filed Dec. 17, 1963, Ser. No. 331,188
7 Claims. (Cl. 88—14.5)

This invention relates to a system for determining the presence in a mixture of a substance having a concentration in excess of a predetermined level and, more particularly, to a system for determining the presence of blood in an unbroken egg.

This application is a continuation-in-part of my copending patent application, Serial No. 45,468, filed July 26, 1960, and entitled "Egg Blood Detector," abandoned December 19, 1963.

In processing eggs, they are graded in accordance with size and quality and sometimes also in accordance with the color of the shell. Classification of eggs in accordance with size is usually carried out in automatic apparatus operative to separate the eggs by weight. Where color classification is desired, it is usually a manual operation effected by visual inspection. Quality classification is more difficult, however, in that it requires inspection of the fluid contents within the shell of the egg.

To a great extent, quality classification depends generally upon the presence or absence of blood within the egg and, more specifically, the amount or concentration of the blood if any is present. Inspection of eggs to determine the quality or the blood concentration therein has been traditionally a manual operation, referred to as candling, in which an egg is held to a light and visually inspected. Not only is this manual technique relatively slow and somewhat unreliable because of variations in human judgment, but it is exceedingly difficult if not impossible to visually detect the presence in an egg of blood which is diffused (in contradistinction to a blood spot or localization of the blood) but which is present in a concentration sufficient to lower the grading classification of the egg. Blood is generally diffused throughout eggs which are quite fresh.

Considerable effort has been made to devise a technique for inspecting eggs by means of equipment which will determine the blood concentration in each egg and segregate those in which the concentration exceeds a predetermined level. To a great extent, such efforts have involved the combination of optical and electronic procedures since it is known that blood will absorb radiant energy at a number of wavelengths, one of which occupies a narrow band at a wavelength of approximately 575 millimicrons; and if radiant energy at such wavelength (which is in the optical spectrum) is transmitted through an egg and onto a light-sensitive device such as a photoelectric cell, the amount of light incident on such device should be less for an egg containing blood than for one that is devoid of blood.

If the amount of light transmitted at such frequency were constant for all bloodless eggs, a simple measurement would indicate whether any of the light energy had been absorbed due to the presence of blood. However, the optical density of eggs varies considerably and it is not possible, then, to establish an objective reference against which the quantity of light transmitted through each egg can be compared. It is further known that radiant energy at certain wavelengths within the optical spectrum is not appreciably absorbed by blood; and therefore, the amount of energy at such a wavelength transmitted through two eggs identical in all respects except that one such egg contains blood would be substantially equal. As a consequence, egg-inspecting arrangements have been proposed in which radiant energy at two different wavelengths (one of which is absorbed by blood and the other of which is substantially unaffected by the presence thereof) is transmitted through an egg, and the amounts of energy at the two selected wavelengths is then compared to determine whether blood in excess of a predetermined concentration level is present in the egg. Thus, a reference is provided which is related to each individual egg being inspected. By way of example, it has been determined that a wavelength in the approximate order of 600 millimicrons is not appreciably absorbed by blood, and two frequencies which can be employed are 575 millimicrons for the blood-sensitive band and 605 millimicrons for the side or reference band.

However, radiant energy substantially unaffected by the presence of blood in an egg at those frequencies which have proven optimum (that is, in the approximate order of 600 millimicrons) has been found to be attenuated at a different rate than the blood-sensitive wavelengths by eggs of various densities. More particularly, at the two wavelengths indicated, the radiant energy is attenuated faster at the reference band frequency as the light-absorbing characteristics (shell thickness, yoke color and shell color—particularly the latter as it varies from white through off-white to dark brown) of eggs increase. Therefore, a simple comparison of the amount of energy transmitted through an egg at the blood-sensitive and reference frequencies does not provide an accurate indication of the presence of blood in an egg unless the optical densities of the eggs being tested are quite similar, which is not the case in the commercial processing of eggs.

In a commercially useful system for detecting the presence fo blood in an egg, consistent accuracy is a requisite and, practicably, this requires that the measurable quantity (which is a reflection of the difference between the amounts of energy transmitted through eggs at the blood-sensitive and reference frequencies) be substantially constant for eggs of all optical densities; and it is a further requirement that this quantity be relatively small so that considerable sensitivity to the presence of blood is provided. For example, blood in a concentration in excess of about 1% should be detected.

In accordance with the present invention, radiant energy in the optical spectrum and at two different wavelengths (one of which is blood-sensitive and the other of which is relatively blood-insensitive) is transmitted through an egg, and the energy at each such two wavelengths is impinged upon respectively associated photosensitive devices. The resultant outputs of such devices are compared, in functional effect, to determine whether blood is present in each tested egg. In the accomplishment thereof, the output of the photoelectric device associated with the reference wavelength is used as a measure of the amount of energy which should be transmitted through any test egg in the absence of blood therein, and is further used in correctively altering the outputs of both photoelectric devices in accordance with any such measurement. Suitable provision is made so that the altered outputs vary at substantially the same rate as the densities of the tested eggs change, and so that the output of one device closely approximates in value the output of the other to enable considerable sensitivity to blood presence to be achieved.

Also in accordance with the present invention, the system operates intermittently so that certain components thereof are energized only during each brief interval that an egg is in test position so as to reduce use and fatigue of such components. Moreover, each egg is inspected along a similar energy-transmission path therethrough (e.g., the end-to-end center line or axis thereof) so that errors that might be introduced by random or unpredictable positioning of eggs are avoided. In addition, each egg can be tested while it is in motion which permits the testing apparatus to operate at relatively high speeds and obviates egg breakage caused by inertia inherent in stop-and-start movements; and the apparatus also includes means whereby each egg when in the precise test position thereof causes energization of the intermittently operated components of the system.

The foregoing features of the system constitute certain objects and advantages of the invention, and additional objects and advantages thereof will become apparent as the specification develops.

An embodiment of the invention is illustrated in the accompanying drawings, in which FIGURE 1 is a broken top plan view, partly in section, of an egg-grading machine incorporating egg blood detection apparatus made in accordance with the invention;

FIGURE 2 is a broken longitudinal sectional view taken along the plane 2—2 of FIGURE 1;

FIGURE 8 is a schematic circuit diagram of the detector;

Figure 3:
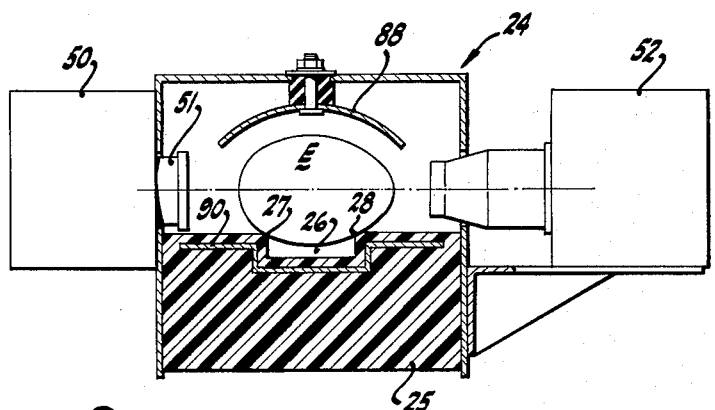
FIGURE 3 is a transverse sectional view taken along the plane 3—3 of FIGURE 1.

The apparatus illustrated in FIGURE 1 is a portion of an egg grading and candling machine which, by way of example, may be the J-70 model of J. W. Wyland & Sons, Inc. of South San Gabriel, California. In such apparatus, eggs are removed from shipping containers and placed on a conveyor which carries the eggs through a washing and drying section, and which then advances the eggs through a candling station where they are inspected for broken, cracked and checked shells and may be given a preliminary inspection to locate those containing relatively large blood spots. Those eggs which are permitted to be discharged from the candling station are deposited on a conveyor generally indicated in FIGURE 1 with the numeral 10. The conveyor comprises a stationary, generally U-shaped track 11 providing a pair of upwardly extending rails 12 and 13. The rails are transversely spaced by a distance sufficient to receive and support eggs E thereon, as shown in FIGURES 1 and 2.

Respectively extending along the rails 12 and 13 in spaced, parallel relation therewith are endless link chains 14 and 15 entrained at opposite ends about suitable sprockets. Thus, in that portion of the apparatus illustrated, the chain 14 is entrained about a drive sprocket 16 and the chain 15 about a sprocket 17. The sprockets 16 and 17 are constrained upon a shaft 18 journalled for rotation in the side plates 19 and 20 of a suitable frame that may also support the track 11. The shaft 18 extends outwardly through the plate 20 and is equipped with sprocket 21 having a drive chain 22 entrained thereabout that, adjacent its opposite end, is appropriately connected with a sprocket and motor means (not shown).

Extending between the chains 14 and 15 at spaced apart locations therealong are a plurality of roller structures 23, each of which is rigidly secured to the chains so as to be carried thereby. The roller structures 23 may be segmented, as shown, and have arcuate intermediate portions which conform generally to the elliptical configuration of eggs. The roller structures may be formed of plastic, and are rotatable. The rotation of the roller structures is utilized at an earlier section of the conveyor to orient the eggs so that the major axis of each is transversely disposed with respect to the track 11. Quite evidently, as the chains 14 and 15 advance from right to left (as viewed in FIGURES 1 and 2), each egg E is positively advanced in such direction by the roller structure 23 disposed just to the right thereof.

Mounted adjacent the discharge end of the conveyor 10 is an egg blood detector apparatus generally indicated with the numeral 24. Such apparatus includes a base 25 which may be made from any conventional synthetic thermosetting resin plastic having good electrical insulating properties. The upper surface or top wall of the base 25 is inclined slightly from right to left as viewed in FIGURES 1 and 2, and has a channel 26 formed therein aligned longitudinally with the track 11. The upper edge portions of the channel 26 define rails 27 and 28 which are respectively aligned with the rails 12 and 13. A bridging element 29 secured to the base 25 provides a pair of rails 30 and 31 that extend generally between the adjacent termini of the respectively aligned rails 12–27 and 13–28 so that a substantially continuous track is provided along the conveyor 10 and through the detection apparatus 24.

Adjacent the terminal end of the detection apparatus 24 is a grading mechanism generally indicated at 32. Throughout the grading mechanism, eggs are segregated in accordance with their weights. The various weighing stations are not illustrated, and comprise a part of the aforementioned egg grading and candling equipment. The first station (which is partially illustrated in both FIGURES 1 and 2) is functionally associated with the detection apparatus 24, and operates therewith to segregate or remove those eggs containing blood in concentrations that exceed a predetermined level. Such station, then, constitutes the reject mechanism by which blood-containing eggs are removed from the stream of eggs being advanced toward the weighing stations.

This reject mechanism includes a platform 33 having a track 34 extending therealong which is aligned longitudinally with the track 26. The track 34 comprises a pair of stationary rails 35 and 36, the first of which terminates in spaced relation with the rail 27. The track 34 has a downwardly and outwardly curved chute 37 at the entrance end thereof which is disposed between the discharge end of the track 29 and the adjacent end of the rail 35 which terminates short of the aligned rail 27. The chute 37 communicates with a collection space, generally indicated at 38, which may include an endless conveyor belt operative to advance the eggs to a remote location.

Operatively arranged with the chute 37 is a movable rail section 39 that in one position thereof forms an extension of the rail 35 and is disposed between such rail and the track rail 27. Adjacent the track 26, the movable rail section 39 has a downwardly projecting leg 40 and is turned laterally adjacent the lower end of the leg so as to extend transversely of the track 34 (as shown at 41). The branch 41 is equipped with an enlarged outer end portion 42 which is pivotally supported intermediate the ends thereof on pin structure 43. As a consequence of this arrangement, the movable rail assembly comprising the components 39, 40 and 41 is selectively movable between an upper position (shown by full lines in FIGURE 4) in which the section 39 defines a continuation of the rail 35 and enables eggs to roll from the track 26 onto the track 34 and over the chute 37, and a lower position (shown by broken lines in FIGURE 4) in which the section 39 is disposed below the multiple-curved surface of the chute 37, in which event eggs being discharged from the track 26 enter the chute and roll therethrough into the collection space 38. Such selective movement of the eggs either along the track 34 or through the chute 37 is indicated by the two arrows in FIGURE 1.

Figure 4:
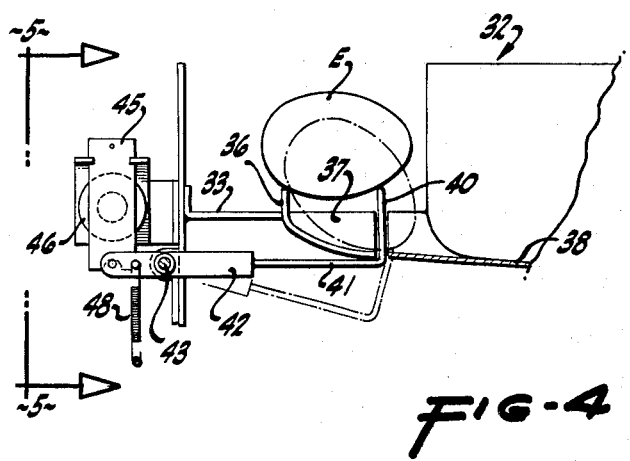
FIGURE 4 is a broken transverse sectional view taken along the line 4—4 of FIGURE 1.
Figure 5:
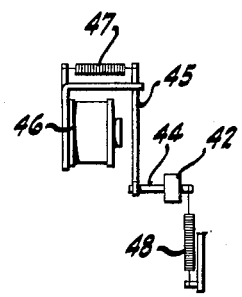
FIGURE 5 is a side view in elevation taken generally along the plane 5—5 of FIGURE 4.

Normally, the movable rail 39 is maintained in the uppermost position thereof by releasable latch structure that comprises a pin 44 that extends through the enlarged end portion 42 of the movable rail section 41 and engages a recess provided therefor in the movable armature or leaf 45 of a solenoid 46. The armature 45 is biased into latching engagement with the pin 44 by a helical spring 47, but when the solenoid is energized the armature 45 is pivoted toward the left, or in a clockwise direction as viewed in FIGURE 5, whereupon the pin 44 is released therefrom and the rail section 41-42 can be pivoted in a clockwise direction (as seen in FIGURE 4) under the weight of an egg bearing downwardly upon the rail section 39. A helical spring 48 connected with the element 42 biases the movable rail structure in a counter-clockwise direction (FIGURE 4), and is used to return the same to the normal uppermost position thereof. Quite evidently, the torque imposed by the spring 48 must be less than the torque imposed by the weight of an egg upon the movable rail 39; and in this respect, the lever arm through which the weight of the egg acts is much greater in length than the lever arm through which the spring force is applied. Apparently then, the solenoid 46 will be energized each time an egg being inspected by the detection apparatus 24 is determined to have a blood concentration exceeding a predetermined value, whereupon such egg will be directed through the chute 37 and into the collection space 38.

Figure 6:
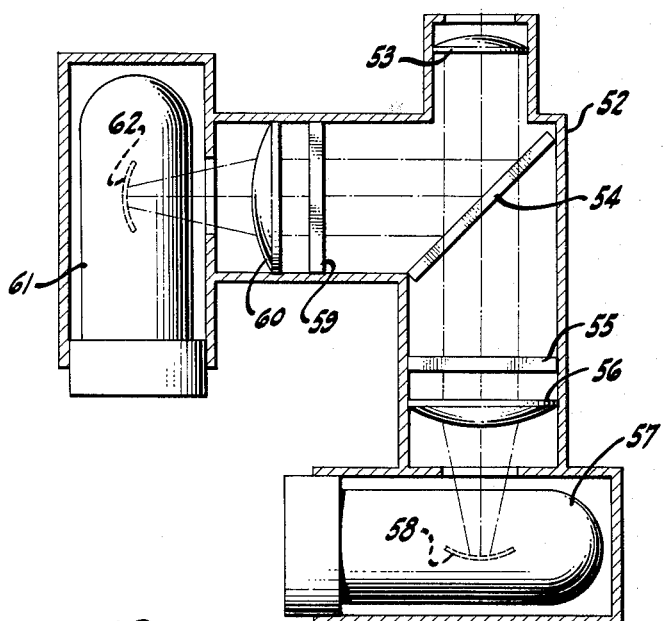
FIGURE 6 is a diagrammatic view of the optical system used in the egg blood detection apparatus.

The blood detection apparatus with respect to the optical components thereof is illustrated in FIGURE 6, and includes a light source 49 which could be an ordinary incandescent lamp but is most effectively a "Quartzline" light sold by General Electric, and a parabolic reflector may be positioned therebehind for the well known purpose of providing parallel light rays. A "Quartzline" light has been found to have a longer life than ordinary incandescent lamps—in the order of 2,000 hours—and the envelope does not blacken internally, apparently because of the tungsten-iodine redepositing cycle. The light 49 is mounted within a housing 50 provided with an exit aperture through which the light is directed outwardly, preferably through a collimating lens 51. The light leaving the housing 50 is directed toward an egg E and is refracted and reflected about inside the egg, is absorbed in part by the various light-absorbing pigments in the egg, and is transmitted in part through the egg. That portion of the light successfully transmitted through the egg E enters a housing 52 through a suitable aperture oriented in alignment with the light transmitted outwardly from the housing 50.

A collimating lens 53 contained within the housing 52 focuses the entering light into a beam of substantially parallel rays which are directed onto a beam splitter 54 which may be a typical half-silvered mirror. The beam splitter 54 divides the collimated light into two separate beams, one of which continues along the same path through the beam splitter 54, through a band pass filter 55 and focusing lens 56 toward a multiplier phototube 57 so as to be incident upon the photosensitive cathode 58 thereof. The other beam is reflected at right angles through a band pass filter 59 and focusing lens 60 toward a multiplier phototube 61 so as to be incident upon the photosensitive cathode 62 thereof.

The band pass filters 55 and 59 may be interference-type optical filters and have a narrow band pass so as to pass therethrough only radiant energy at the wavelengths selected. Thus, the filter 55 may be selected to pass the reference or side band wavelength therethrough which is in the order of 600 millimicrons, and as a specific example may be approximately 605 millimicrons although the wavelength of 597 millimicrons has been found to be exceedingly advantageous. The filter 59, then, constitutes the blood-band filter and is selected to pass therethrough radiant energy of aproximately 575 millimicrons. Evidently then, the amount of light incident on the cathode of the multiplier phototube 57 will be proportional to the amount of light transmitted through the egg E at the reference or side band frequency, and the amount of light incident on the cathode of the multiplier phototube 61 will be proportional to the amount of light transmitted through the egg at the blood-band frequency. In that the blood-band wavelength is sensitive to the presence of blood in an egg and will be absorbed in part by any blood present therein, the amount of light reaching the cathode of the multiplier phototube 61 will be reduced below that reaching the cathode of the multiplier phototube 57 when an egg being tested contains blood.

Multiplier phototubes are advantageously used for detecting low intensity light because the minute current generated by light impinging on the photocathode of the tube is amplified by the action of a series of dynodes or secondary emission stages contained within the tube itself, thereby obviating the necessity of amplification stages that might otherwise be required. In the operation of such a tube, light incident upon the photocathode thereof causes the release of electrons which are attracted to the first of the series of dynodes—which first dynode is maintained at a positive potential relative to the photocathode by an amount usually in the order of 100 to 200 volts. The electrons arriving at the first dynode cause the release of secondary electrons that are ejected from the dynode surface at a relatively low velocity. Such released electrons are accelerated toward the second dynode, the surface of which is maintained at a positive potential with respect to the first dynode. The arrival of such electrons at the second dynode causes the release of a greater number of electrons which are then attracted toward the third dynode, and so forth.

The number of secondary electrons emitted per primary electron at each dynode stage is essentially a function of the kinetic energy of each primary electron, and such kinetic energy is directly proportional to the potential difference between the emitting dynode from which the primary electron was emitted and the dynode at which it arrives. Evidently then, the anode current of a multiplier phototube is a function of the amount of light incident upon the photocathode thereof and also of the potential applied across the tube—that is, the potential difference between the respectively successive elements along the flow path of current therethrough.

Figure 7:
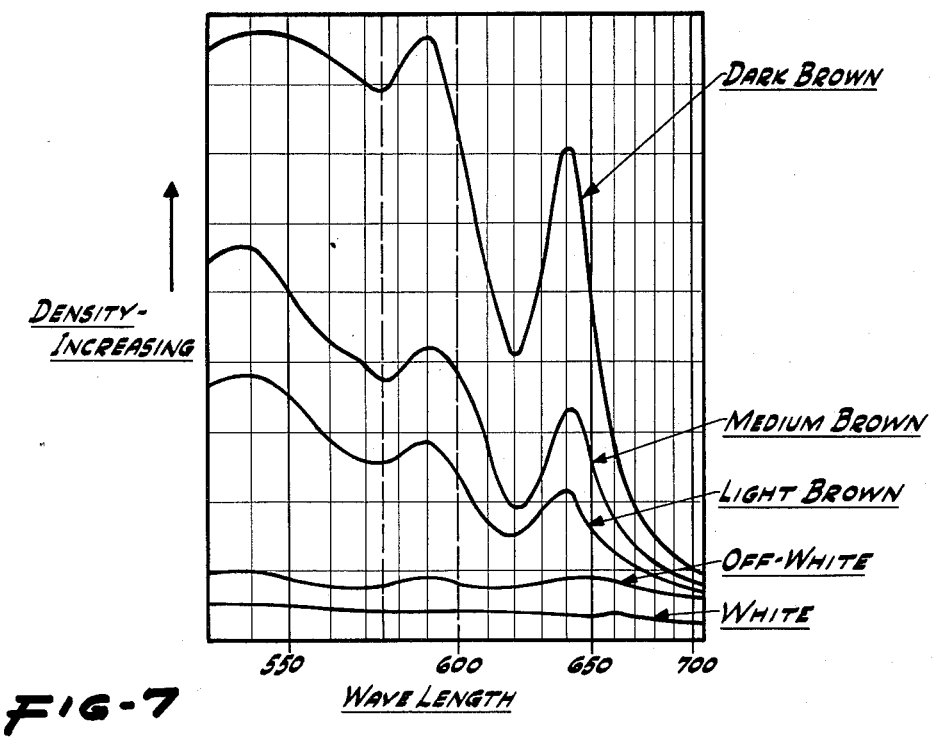
FIGURE 7 is a graph illustrating the attenuation rate of light of various wavelengths transmitted through eggs having different optical densities.

Referring to FIGURE 7, it is seen that the amount of light transmitted through an egg varies considerably with the density or light-absorbing characteristics of the egg, and also that the rate of change of absorption at the respective blood-sensitive and blood-insensitive wavelengths of 575 millimicrons and approximately 600 millimicrons is quite different. More particularly, for an egg having a white shell, the amount of light transmitted through the egg is substantially the same at all of the wavelengths indicated along the x axis of the graph, and there is little difference between the absorption rates at the two wavelengths under consideration. However, as the eggshell color changes through off-white, light brown, medium brown, and to dark brown, the amount of transmitted energy absorbed increases, and the rate of change of the energy transmitted through the egg as between the blood-sensitive and blood-insensitive wavelengths is quite different—specifically, the transmission rate at the blood-insensitive wavelength falls off much more rapidly than at the blood-sensitive wavelength as the color pigments in the eggshell increase.

In that the current output or anode current of a multiplier phototube is a function of the amount of light incident on the photocathode thereof, it is quite apparent from a consideration of FIGURE 7 that the difference between the current outputs of the multiplier phototubes 57 and 61 would be considerably greater for an egg having a shell color of dark brown than for an egg having a white shell color (both eggs being devoid of blood). Consequently, as mentioned hereinbefore, a simple difference measurement between the current outputs would not provide an accurate indication of the presence or absence of blood in an egg for all eggs irrespective of the shell color thereof.

In the present apparatus, provision is made to accommodate or compensate for such differences in the rate of change of the radiant energy transmitted through the eggs; but prior to considering such subject in detail a description of the circuit illustrated in FIGURE 8 will be set forth. The multiplier phototube 57, in addition to having a photosensitive cathode 58, is provided with an anode 63 and a plurality of dynodes interposed therebetween—there being nine in number in the specific tube illustrated. The dynodes of the tube 57 are connected in the usual manner to the several taps of a resistance-type voltage divider generally indicated by the numeral 64—one end of which is connected to the cathode 58, and the other end of which is connected to a point of fixed potential, or specifically ground. The multiplier phototube 61 has an anode 65 and a plurality of dynodes—there being nine in number. The dynodes of this tube are connected to the several taps of a resistance-type voltage divider generally indicated by the numeral 66—one end of which is connected to the photo-cathode 62, and the other end of which is connected to the adjustable tap of a potentiometer 67 connected between ground and a negative voltage supply 68.

An electron discharge device in the form of a pentode vacuum tube 69 is included in the circuit, and has a grounded cathode and its anode connected through a resistance 70 to a high voltage D.C. power supply indicated in general by the terminal 71. The suppressor grid of the tube 69 may be grounded, as illustrated, and a positive voltage is applied to the screen grid from an appropriate voltage supply 72. A capacitance 73 having one of its terminals connected to the anode of the tube 69, has the other terminal thereof connected to the junction of a pair of resistances 74 and 75—the first of which is variable and has the opposite side thereof connected to the voltage divider 64 or, more particularly, to the cathode 58 of the multiplier phototube 57. The resistance 75 is fixed, and its opposite side is connected to the voltage divider 66 and in particular to the photosensitive cathode 62 of the tube 61.

The control grid of the tube 69 is directly connected to the anode of the phototube 57, and the anode is connected through a resistance 76 to the output terminal of a pulse generator 77. The output terminal of the pulse generator is also connected through a variable resistance 78 to the anode of the phototube 61. The output terminal of the pulse generator 77 is further connected through a resistance 79 to a power supply 80 providing a negative potential at the junction of the resistances 76 and 78 (the control grid of the tube 69 is connected to such junction through the resistance 76). The biasing potential applied to the tube 69 normally maintains the same in a cut-off condition.

The pulse generator 77 is operable to produce a positive-going voltage pulse at its output terminal of sufficient value to cause the tube 69 to conduct; and the generator is cyclically conditioned to produce such positive-going pulse. The operation thereof is controlled through a switching circuit which may include a monostable multivibrator 81 having output connections to the pulse generator 77 and to the reset terminal of an integrator 82. Such switching circuit selectively includes one or the other of an electronic switch 83 or a mechanical switch 84 and delay circuit 85 in series therewith, selectively connected to an appropriate power supply 86 through a switch 87 which may be manually operated.

The switch 84 is a mechanical means for connecting the power supply 86 to the multivibrator 81, and will be associated with the conveyor mechanism that advances the eggs E into the detector apparatus 24. The switch 84 will be closed just prior to an egg reaching the inspection position illustrated in FIGURE 1; and the closing thereof provides an electric pulse, which is delayed by an adjustable amount in the delay circuit 85, so that the mulivibrator 81 is triggered just as the egg reaches precisely the desired inspection position. The delay circuit 85 may be any of various well known adjustable delay circuits, such as a resistance-capacitance network or a monostable multivibrator provided with adjustments in its timing network, and in certain instances a mechanical delay device may be advantageously employed. If the manually adjustable selector switch 87 is in a position such that the electronic switch 83 is connected to the power supply 86, the multivibrator 81 will be triggered by a pulse therefrom. The electronic switch will be described in further detail hereinafter.

The multivibrator 81 produces a pulse of fixed but short duration; and in the particular apparatus illustrated, the time of such pulse is approximately five milliseconds. During such five-millisecond period, each of the multiplier phototubes 57 and 61 is energized and an egg in the inspection position shown in FIGURE 1 is tested for the presence of blood therein. At all other times, the multiplier phototubes are deenergized—whereby the detection circiut is effectively "on" during only the brief intervals that an egg is precisely positioned at the inspection station, and is "off" during the much longer intervals between such positioning of successive eggs. Such pulsed operation of the circuit significantly minimizes fatigue of the multiplier phototubes, and thereby provides stable and reliable operation over extended periods of use without recalibration. The stated period of five milliseconds is not critical, and it may be increased or decreased somewhat depending upon the speed of any associated egg-handling equipment.

Each five-millisecond pulse generated by the multivibrator 81 energizes the pulse generator 77 for a like period, with the result that the generator 77 provides at its output terminal a pulse of accurately controlled duration (e.g., five milliseconds) and of accurately controlled positive amplitude sufficient to cause the tube 69 to conduct. The generator 77 may be of any conventional type such as those used for generating pedestal pulses in television circuits, and depending upon particular installations, it may produce a plurality of different pulses for controlling various other components. When the output terminal of the generator 77 becomes positive, the tube 69 conducts current and, necessarily, the voltage drop thereacross suddenly decreases in value. Thereupon, the capacitance 73 commences to discharge through the resistances 74 and 75 and through the voltage dividers 64 and 66, with the result that the voltage thereby caused to appear across the phototubes 57 and 61 effects current conduction thereof.

Responsive to the voltages then present across the phototubes and to the light incident upon the photo-cathodes thereof, the phototube 57 begins to conduct current and the resultant anode current thereof flows through the resistance 76 producing a voltage drop thereacross in a direction that decreases the voltage applied to the control grid of the tube 69. This change in the control grid potential results in a decrease in the current conducted by the tube 69, thereby tending to counteract the drop in voltage at the anode thereof (i.e., the voltage drop across the tube increases). This negative feedback action regulates the anode currents of the multiplier phototubes 57 and 61 in that the magnitude of the voltage difference applied between the respective cathodes and anodes thereof depends upon the charge on the capacitance 73, which in turn is dependent upon the amount of anode current of the tube 69 and anode potential resulting therefrom. Thus, the anode currents of the multiplier phototubes 57 and 61 are controlled by this regulatory action so as to be substantially constant irrespective of variations over a wide range in the intensity of the light incident on the photocathodes 58 and 62 thereof.

Figure 9:
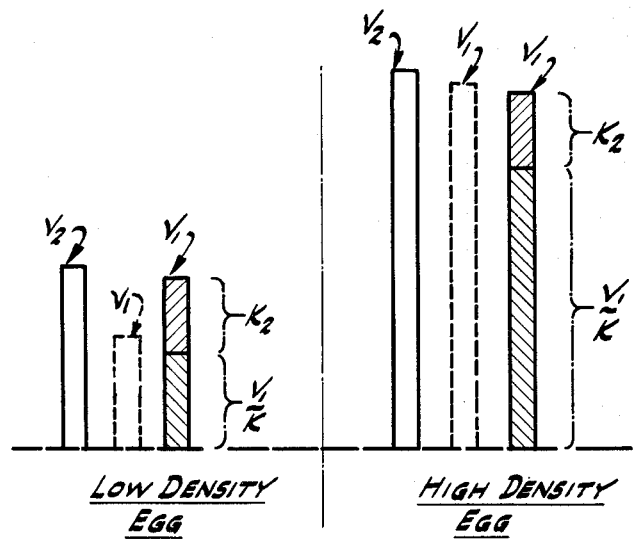
FIGURE 9 is a graph comparing the measurable outputs of the photoelectric devices respectively associated with the blood-sensitive and reference wavelengths for eggs of different densities.

Considering the potentials applied to the multiplier phototubes 61 and 57 and referring to FIGURE 9 in particular, the voltage indicated in such figure as being applied to the phototube 61 is designated with the nomenclature $V_1$ and that applied to the phototube 57 as $V_2$. Consider that the output or anode currents of the two phototubes are maintained at substantially constant values, the voltages $V_1$ and $V_2$ could be compared in suitable circuitry so that if the optical density in the blood-band (the voltage $V_1$) were greater than the optical density in the side band (the voltage $V_2$), the voltage $V_1$ would be greater than $V_2$ when an egg under test contained blood, and the egg would then be rejected on the basis of this voltage difference. The circuit criterion for rejection, then, would be $V_2-V_1$ is equal to or less than zero.

This condition would be adequate for low density eggs in that the voltage difference between $V_2$ and $V_1$ (as indicated by broken lines) is quite large, particularly if adjustment is made for balancing the potential applied to each tube on blood-free eggs such that the criterion for rejection would be $V_2-KV_1$ is equal to or less than zero. However, an additional factor is necessary to accommodate high density eggs. In this respect, if the difference is compared between the voltages $V_1$ and $V_2$ (the first of which being shown by the broken-line illustration) for both low density and high density eggs, it is seen that the voltage $V_1$ increases much more rapidly than the voltage $V_2$ as the density of the eggs increases. Thus, for high density eggs, the margin $V_2-V_1$ is smaller than for low density eggs; and in some cases the margin disappears or even shifts the other way which would cause false egg rejections. Moreover, no value of K is available which provides a close but safe margin for the potential difference between the voltages $V_1$ and $V_2$ for eggs of all densities.

Since the voltage $V_1$ grows faster than the voltage $V_2$ as the egg density increases, if the voltage $V_1$ is divided by an appropriate constant K, the term $V_1$ divided by K can be made to grow at substantially the same rate as the voltage $V_2$. This is evident by comprising the voltages $V_2$ and $V_1$ divided by K for both low density and high density eggs in FIGURE 9. However, the margin or difference between the two voltages is much too great for the sensitivity required in the commercial detection of blood in eggs. Therefore, a constant term $K_2$ is added to the term $V_1$ divided by K to decrease the margin or voltage difference to a small constant value. By comparing the voltages $V_2$ and $V_1$ divided by K plus $K_2$ for low density and high density eggs, as illustrated in FIGURE 9, it can be seen that the circuit can be compensated to provide a safe but sensitive margin for both low and high density eggs; and whereas in the aforementioned case in which compensation is not made the margin or voltage difference substantially disappeared for high density eggs, it does not so disappear in the compensated case. Thus, the criterion for egg rejection is $V_2-(V_1$ divided by $K)-K_2$ is equal to or less than zero.

Returning to the circuit illustrated in FIGURE 8, the aforedescribed negative feedback control over the anode currents of the multiplier phototubes 57 and 61 maintains such anode currents relatively constant irrespective of the amount of light incident on the photocathodes thereof. Therefore, for an egg being inspected of high density or of low density, and although the amount of light reaching the photosensitive cathodes would be much greater for the low density egg than for the high density egg, the anode currents for the respective multiplier phototubes is substantially the same in either case. Thus, the constant current factor in the foregoing analysis is provided. Limiting the phototube current on low density eggs also protects the tubes and increases the life thereof.

The resistances 74 and 75 define a predetermined ratio between the voltages applied across the phototubes 57 and 61, which in function is equivalent to dividing the voltage $V_1$ by a constant term K in the foregoing symbolic expression of the criterion for egg rejection. In this respect, the vacuum tube 69 is essentially in series connection with the phototubes 57 and 61, which are related with respect to each other in substantial parallelism. Thus, when the tube 69 is cut-off, the resistance thereof becomes infinitely high and the voltage drop across this series circuit appears almost entirely across the vacuum tube. Such voltage, by way of example, would usually be in the range of about 1,200 to 1,500 volts. Thus, the capacitance 73 is charged to approximately the same voltage value. When tube 69 begins to conduct, the capacitance 73 commences to discharge, and the current path is to ground through the resistances 74 and 75 and primarily through the respectively associated voltage divider networks 64 and 66 (a small portion of the current flow is through the tubes 57 and 61).

Evidently then, a voltage drop occurs across the resistances 74 and 75 so that the net voltage across the tube 57 necessarily excludes the amount of the voltage drop across the resistance 74. Similarly, the net voltage across the tube 61 necessarily excludes the amount of the voltage drop across the resistance 75. In that the current amplification of a multiplier phototube is dependent upon the magnitude of the potential difference between the respectively successive elements thereof, the higher the value of the resistance 74 for example, for a given current flow, the lower will be the amplification of the multiplier phototube 57 and the anode current thereof. The same is true of the resistance 75 and its associated phototube 61. Consequently, the values of the resistances 74 and 75 may be determined to provide the desired ratios of gains or amplification between the two phototubes 57 and 61 so as to enable the voltages $V_2$ and $V_1$ to change at substantially the same rates (it should be appreciated that if a constant-current condition is maintained, the voltage across either of the multiplier phototubes is inversely related to the amount of light incident upon the photocathode thereof or, stated another way, as the density of an egg increases, the voltage across the multiplier phototubes must be increased if the anode current thereof is to remain substantially constant).

In the particular circuit illustration, the resistance 74 is made variable to permit accurate tailoring of the circuit, and it also affords a ready means for compensating the circuit for different basic phototube gains. A voltage reference device—a Zener diode, for example—can be used for one or the other of the resistances 74 and 75 (usually the resistance 75) to provide a constant voltage drop thereacross independent of the magnitude of the current flowing therethrough. In the instance of the use of a voltage reference device, the ratio of the voltages across the phototubes 57 and 61 varies somewhat in accordance with the magnitudes of the current flows through the voltage dividers 64 and 66. For example, if the current flows should increase, which would correspond to a condition in which a more dense egg is being inspected, the ratio of the voltage across the tube 61 to the voltage across the tube 57 would increase because there would be no increase in the voltage drop across the resistance 75 (that is, Zener diode), but there would be an increase in the voltage drop across the resistance 74.

The constant term $-K_2$ in the foregoing expression of the criterion for egg rejection is obtained by means of the potentiometer 67 and voltage source 68 associated therewith. Although this term is arithmetically added to the term $V_1$ divided by K in obtaining the voltage $V_1$ in the illustration of FIGURE 9, the term is a negative quantity in the algebraic expression of the egg rejection criterion, and, therefore, can be subtracted from the positive term $V_2$. The circuit defined by the potentiometer 67 and voltage source 68 places one end of the potentiometer at a potential that is negative with respect to ground. Therefore, the potential at the variable tap of the potentiometer will usually be below ground potential. As a result, the voltage drop across the phototube 61 (that is, from the cathode 62 to the final dynode thereof) will be less than the corresponding voltage drop across the tube 57. Evidently then, the voltage $V_2$ is decreased by some constant value dependent upon the position of the variable tap of the potentiometer 67 or, conversely, the relative value of the voltage $V_1$ has been increased by such constant term.

Components of the detector optical system exhibit differences that collectively affect the degree of light transmission in each of the channels. In this respect, the filters provide some band width differences and the dichroic or beam splitting mirrors used do not have identical intensity ratios in the two transmission directions thereof. Further, the sensitivities of the photocathodes of multiplier phototubes differ. All of such differences can be adjusted or weighted to obtain the desired ratio of performance between the channels by proper adjustment of the resistance 78.

In further describing the function of the circuitry, and assuming that the resistance 78 is adjusted to have precisely the same resistance as that of the resistor 76, the circuit is tailored so that the voltage drop across the resistance 78 slightly exceeds the voltage drop across the resistance 76 when the egg tested is bloodless. Therefore, the anode of the phototube 57 is prevented from assuming a substantially positive potential by the negative feedback regulation heretofore described. The anode of the phototube 61 will not assume a substantially positive potential so long as the eggs under test are bloodless.

However, when an egg containing a predetermined quantity of blood is inspected, the amount of light incident on the cathode of the phototube 61 is reduced somewhat relative to the amount of light incident on the cathode of the phototube 57; and as a consequence, the phototube 61 conducts less current and the voltage drop across the resistance 78 is smaller than normal. As a result, the anode of the phototube 61 becomes more positive to an extent dependent upon the amount of blood present in the egg and is then an indication of the presence of blood therein. The resistances 76 and 78 may both be fixed, but greater flexibility and circuit adjustment is afforded by making the resistance 78 variable as, for example, in adjusting for small differences in phototube sensitivities, differences in transmission efficiencies of the several parts of the optical system, and other inequalities.

As explained heretofore, positive-going voltages at the anode of the phototube 61 indicate the presence of blood in an egg being inspected. However, it is not desirable to depend solely upon momentary voltage spikes as some statistical fluctuation and "noise" in the various circuit voltages is to be expected. Hence, the preferable practice is to integrate or average the voltage at the anode of the phototube 61 over the interval that an egg is being inspected (the exemplary five milliseconds). For this purpose, the anode of the phototube 61 is connected to the input terminal of the integrator 82 which may be any of various well known electronic integrating circuits—for example, a vacuum tube or transistor controlling the rate of charging or discharging of a capacitance. If the integrated voltage over such time period exceeds a preset value determined by the circuit design, the output terminal of the integrator attains a sufficient voltage to trigger a monostable multivibrator 91 which thereupon energizes the relay 46 controlling the reject mechanism 39. Between integrating periods, the integrator 82 is reset (e.g., its capacitance is recharged) as by means of a signal supplied to its reset terminal from the multivibrator 81.

The electronic switch 83 comprises a pair of capacitors defined by an upper conductive plate 8 (FIGURE 3) and a pair of lower plates 89 and 90 (FIGURES 1 and 2) electrically isolated from each other. The plates 89 and 90 are embedded in the base 25 and are longitudinally separated by a distance, for example, of $\frac{1}{64}$ of an inch. The upper plate 88 is generally arcuate (as shown in FIGURE 3), and is substantially as long as the aggregate length of the plates 89 and 90. Ordinarily, the dielectric between the upper and lower plates is for the most part comprised of air, and the capacitances of the capacitors (88–89 and 88–90) are substantially equal.

Evidently, when an object is positioned between the upper and lower plates, the dielectric between such plates is changed, and as a consequence the capacitance is changed. Clearly then, if an egg is positioned between the lower plate 89 and upper plate 88, the capacitance of the capacitor 88–89 will be different from that of the capacitor 88–90. Likewise, the capacitances will be different if an egg is in alignment with the plate 90. However, when an egg is in the position illustrated in FIGURE 1, in which the egg portions interposed into both capacitors are substantially equal, the capacitances thereof will be equal and a condition of balance is defined, just as in the case when no object underlies the upper plate 88. Therefore, there are two conditions of capacitor balance—one is the normal condition in which no egg underlies the upper plate 88, and the other is when an egg is in the precise test position shown in FIGURE 1.

Figure 10:
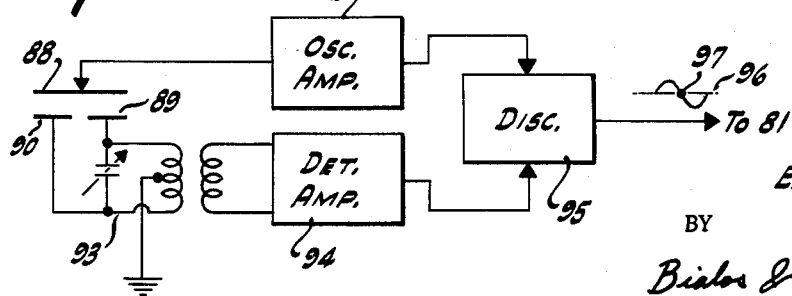
FIGURE 10 is a schematic circuit diagram of the electronic switch.

The condition of the capacitors can be sensed in appropriate circuitry which will operate to produce a signal coincident with an egg being located at the definitive test position, which signal is then utilized to trigger the multivibrator 81. A circuit used for this purpose is illustrated in FIGURE 10. Referring thereto, the upper plate or anode 88 is connected to an oscillator preferably through an amplifier, and such oscillator-amplifier composition is designated with the numeral 92. The oscillator and amplifier may be completely conventional, and a circuit having an oscillatory frequency in the approximate order of 35 kilocycles (34 kc.) has been found effective. The lower plates or anodes 89 and 90 are respectively connected to a resonant circuit such as the inductance-capacitance tank 93. In the specific illustration, the inductance has a grounded center tap and the capacitance is variable.

The inductance of the tank 93 comprises one winding of a coupling transformer, the other winding of which is the input to a detector amplifier 94. The output terminal of the detector amplifier 94 is connected to the input of a discriminator 95, which also receives a reference signal from the oscillator amplifier 92. The detector amplifier and discriminator may be conventional, and transistorized circuits have been used effectively. The circuits are adjusted so that when the paired capacitances 88–89 and 88–90 are in a condition of balance, this condition is determined by the discriminator through a comparison of the two signal inputs thereto. However, when an egg moves between the plates of the capacitance 88–89, the resulting circuit unbalance causes a signal swing from the zero signal axis, indicated at 96 in association with the waveform depiction at the output of the discriminator, a return to such axis when the egg is symmetrically located with respect to the two capacitances (that is, at the definitive test position), and a swing in the opposite direction as the egg moves between the plates of the capacitance 88–90. The discriminator is arranged to provide a signal output at the cross-over point 97 when the signal swing commences in one predetermined direction (that is, in the positive direction with respect to the zero axis 96). However, should the signal swing be in the opposite direction (negative-to-positive), which would be caused by an egg moving first between the plates of the capacitance 88–90 and thereafter between the plates of the capacitance 88–89, the discriminator would produce no signal output. Thus, both direction-of-movement and location of an egg at the definitive test position are sensed by the circuit.

As stated heretofore, the conveyor structure defined by the track 26 is inclined and the eggs E roll freely therealong from right to left under the influence of gravity, the effects thereof being opposed by normal frictional resistance to movement, and augmented by the velocity of the eggs when discharged onto the rails 27 and 28, etc. Thus, the eggs move continuously through the detector apparatus 24 and inspection station defined thereby, and all stop-and-start egg motions are eliminated. Consequently, egg breakage due to the inertia inherent in stop-and-start movements is obviated and the apparatus is especially suited to high speed inspection operations. In this respect, operating speeds of three eggs per second moving through the testing station are not unusual and much higher rates can be accommodated. Even at a rate of ten eggs per second and with an operating duration of approximately five milliseconds per egg, the multiplier phototubes would still be deenergized about 95% of the time.

In that the eggs move continuously, they are in motion during the test interval. The velocity of motion cannot be predicted with accuracy, however, because of the different sizes and weights of eggs, the fluid distribution therein, the differences in egg contour which affects the rolling freedom thereof, and other similar factors. Therefore, the precise instant at which any particular egg will be at the definitive test position cannot be predicted accurately. The electronic switch 83 is particularly advantageous in this connection because it obviates the timing discrepancies which might otherwise arise because the egg itself, when at the definitive test position and only at that time, causes the inspection apparatus to be energized. Therefore, there is consistency in the inspection of eggs in that the path of light transmission through each egg is substantially the same. The particular viewing axis through an egg is not in itself critical, but much better results are attained when such axis is substantially the same for each egg. In the embodiment illustrated and described, the viewing axis is from end-to-end of each egg, and the U-shaped track contributes to such orientation of the eggs in that it enables the same to roll therealong with such major or end-to-end axis being oriented transversely of the track. It has been found that eggshells are quite abrasive and that the ordinary synthetic resin plastics having good insulating properties which can be used for the base 25 are quite sensitive to the eggshell abrasion and wear quickly. For this reason, the rails 27 and 28 are made of ceramic, and can be provided by inserting narrow ceramic strips along the upwardly extending walls of the U-shaped channel such that the upper edges of the ceramic strips define the rails.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

I claim:

1. In apparatus for determining the presence in a mixture of a substance having a concentration in excess of a predetermined level, such mixture being adapted to pass therethrough energy of a first wavelength and of a second wavelength the intensity of only one of which is substantially unaffected by the presence of such substance in the mixture, a pair of multiplier phototubes respectively associated with said first and second wavelengths and each having an anode, cathode and plurality of dynodes, circuit means including said multiplier phototubes and comprising means for applying voltages across each such tube and between the respectively successive elements thereof to cause the tubes to conduct and thereby provide anode currents, said means for applying voltages to said multiplier phototubes including voltage-dropping variable-impedance means connected in series with each of said multiplier phototubes and being operative selectively to provide a high impedance in which case substantially the entire voltage necessary for operation of said multiplier phototubes is dropped across said variable-impedance means so that said tubes are then inoperative and to provide a relatively low impedance in which case a sufficient magnitude of the voltage otherwise dropped across said variable-impedance means appears across said multiplier phototubes and causes operation thereof, means for regulatively adjusting the impedance of said variable-impedance means in the latter condition thereof in response to variations in the value of the anode current of the multiplier phototube associated with the wavelength the intensity of which is substantially unaffected by the presence of such substance in the mixture to maintain both of said anode currents relatively constant irrespective of variations in the average intensity of the energy transmitted through such mixture, and means responsive to the presence of such mixture at a position to have said first and second wavelengths transmitted therethrough for changing the condition of said variable-impedance means from the high to the relatively low states thereof so that said tubes are operative only during the intervals that a mixture is at such energy-transmitting position.

2. The apparatus of claim 1 in which said variable-impedance means comprises an electron discharge device, the conditions of high and relatively low impedance being respectively defined by the states of cut-off and conduction of said device, said means for changing the condition of said variable-impedance means being connected with said discharge device for applying bias thereto.

3. In apparatus for determining the presence in an unbroken egg of blood or the like in a concentration in excess of a predetermined level, an energy source providing first and second wavelengths and to which such egg is exposed so as to transmit such energy therethrough, said first wavelength having a value such that a portion of the energy thereof is absorbed by blood in an egg and the second wavelength being substantially unaffected by the presence of blood, a pair of multiplier phototubes respectively associated with said first and second wavelengths for receiving the energy transmitted through such egg and each having an anode, cathode and plurality of dynodes, circuit means including said multiplier phototubes and comprising means for applying voltages across each such tube and between the respectively successive elements thereof to cause the tubes to conduct and thereby provide anode currents, means for maintaining the anode current of each of said multiplier phototubes substantially constant irrespective of the optical density of any egg being exposed to said energy source, means for establishng the ratios of the voltages applied across said multiplier phototubes so that the current amplifications thereof tend to vary in the ratio of $V_2$ to $V_1$ divided by K, where $V_2$ is the voltage across the multiplier phototube associated with the wavelength substantially unaffected by the presence of blood in an egg, $V_1$ is the voltage across the other multiplier phototube, and K is a constant selected to maintain the difference between the applied voltages substantially the same for eggs from low to high optical densities, means for changing the value of one of said voltages by a constant $K_2$ so that the criterion for indicating the presence of blood in an egg in excess of such predetermined level is established by the expression $$V_2 - (V_1 \text{ divided by } K) - K_2$$

is equal to or less than a selected constant value, said means for applying voltages to said multiplier phototubes including variable-impedance means connected in series with each of said multiplier phototubes and being operative selectively to provide a high impedance in which case substantially the entire voltage necessary for operation of said multiplier phototubes is dropped across said variable-impedance means so that said tubes are then inoperative and to provide a relatively low impedance in which case a sufficient magnitude of the voltage otherwise dropped across said variable-impedance means appears across said multiplier phototubes and causes operation thereof, and means responsive to the presence of such egg at a position to have said first and second wavelengths transmitted therethrough for changing the condition of said variable-impedance means from the high to the relatively low states thereof so that said tubes are operative only during the intervals that a mixture is at such energy-transmitting position.

4. The apparatus of claim 3 in which said means for maintaining each of said anode currents relatively constant comprises means for regulatively adjusting the impedance of said variable-impedance means in the latter condition thereof in response to variations in the value of the anode current of the multiplier phototube associated with the wavelength the intensity of which is substantially unaffected by the presence of blood in an egg to maintain both of said anode currents relatively constant irrespective of variations in the average intensity of the energy transmitted through such egg.

5. The apparatus of claim 3 in which the voltage represented by the constant term $K_2$ is subtracted from the voltage across the multiplier phototube associated with the blood-sensitive wavelength.

6. In apparatus for determining the presence in a mixture of a substance having a concentration in excess of a predetermined level, such mixture being adapted to pass therethrough energy of a first wavelength and of a second wavelength the intensity of only one of which is substantially unaffected by the presence of such substance in the mixture, an energy source providing said first and second wavelengths and to which such mixture is exposed, means responsive to such energy after passage thereof through such mixture for dividing the energy into two energy beams, first and second filters respectively interposed in the path of said energy beams and being respectively effective to pass energy beams therethrough having the aforesaid first and second wavelengths, a first multiplier phototube arranged to receive said first energy beam, a second multiplier phototube arranged to receive said second energy beam, each of said phototubes having an anode and a cathode and a plurality of dynodes, first and second resistance-type voltage dividers connected to said first and second phototubes respectively, each of said first and second dividers being connected at one end to the cathode of the phototube and having a plurality of taps connected to successive dynodes of the phototube, an adjustable voltage source connected to the opposite end of one of the aforesaid dividers, means connecting the opposite end of the other divider to a point of fixed potential, a vacuum tube having at least an anode and a cathode and a control grid, the cathode of said vacuum tube being connected to a point of fixed potential, a D.C. voltage supply, a first resistor connected between said D.C. voltage supply and the anode of said vacuum tube, a capacitor connected to the anode of said vacuum tube, a second resistor connected between said capacitor and the cathode of said first phototube, a third resistor connected between said capacitor and the cathode of said second phototube, means for adjusting the ratio of resistances of said second and third resistors, the control grid of said vacuum tube being connected to the anode of said first phototube, a pulse generator, fourth and fifth resistors connecting said pulse generator to the anodes of said first and second phototubes respectively, means for adjusting the ratio of resistances of said fourth and fifth resistors, an integrator connected to the anode of said second phototube, and trigger means controlled by said integrator and triggered thereby when a mixture under test contains such substance in excess of the aforementioned predetermined level.

7. A detector of blood in eggs, comprising means for directing light through an egg to be inspected, means for splitting the light transmitted by the egg into first and second beams, a filter disposed in the path of said first beam and limiting the same to wavelengths of approximately 575 millimicrons, a filter disposed in the path of said second beam and limiting the same to wavelengths of approximately 605 millimicrons, a first multiplier phototube arranged to receive the filtered light of said first beam, a second multiplier phototube arranged to receive the filtered light of said second beam, each of said phototubes having an anode and a cathode and a plurality of dynodes, first and second resistance-type voltage dividers connected to said first and second phototubes respectively, each of said first and second dividers being connected at one end to the cathode of the phototube and having a plurality of taps connected to successive dynodes of the phototube, an adjustable voltage source connected to the opposite end of one of the aforesaid dividers, means connecting the opposite end of the other divider to a point of fixed potential, a vacuum tube having at least an anode and a cathode and a control grid, the cathode of said vacuum tube being connected to a point of fixed potental, a D.C. voltage supply, a first resistor connected between said D.C. voltage supply and the anode of said vacuum tube, a capacitor connected to the anode of said vacuum tube, a second resistor connected between said capacitor and the cathode of said first phototube, a third resistor connected between said capacitor and the cathode of said second phototube, means for adjusting the ratio of resistances of said second and third resistors, the control grid of said vacuum tube being connected to the anode of said first phototube, a pulse generator, fourth and fifth resistors connecting said pulse generator to the anodes of said first and second phototubes respectively, means for adjusting the ratio of resistance of said fourth and fifth resistors, an integrator connected to the anode of said second phototube, and trigger means controlled by said integrator and triggered thereby when the egg contains blood.

References Cited by the Examiner

UNITED STATES PATENTS

| 2,362,774 | 11/1944 | Romanoff | 209—81 |
| 2,565,265 | 8/1951 | Peterson | 88—14 |
| 2,987,182 | 6/1961 | Ator et al. | 88—14.2 |
| 3,009,101 | 11/1961 | Locher | 324—61 |
| 3,067,872 | 12/1962 | Fouse et al. | 88—14 |
| 3,152,677 | 10/1964 | Phillips | 209—81 |

OTHER REFERENCES

Norris, "Detects Green Rot in Eggs," Electronics, volume 28, Issue 7, July 1955, pages 140–142.

JEWELL H. PEDERSEN, *Primary Examiner.*

O. B. CHEW, *Assistant Examiner.*